No. 752,477. PATENTED FEB. 16, 1904.
H. STOUT.
ICE MAKING APPARATUS.
APPLICATION FILED MAR. 27, 1903.
NO MODEL. 2 SHEETS—SHEET 1.

WITNESSES:
Charles S. Watson
E. E. Ellis

INVENTOR
Hiram Stout
BY
ATTORNEYS.

No. 752,477. PATENTED FEB. 16, 1904.
H. STOUT.
ICE MAKING APPARATUS.
APPLICATION FILED MAR. 27, 1903.
NO MODEL. 2 SHEETS—SHEET 2.

WITNESSES:
Charles T. Watson
E. E. Ellis

INVENTOR
Hiram Stout
BY
ATTORNEYS.

No. 752,477. Patented February 16, 1904.

UNITED STATES PATENT OFFICE.

HIRAM STOUT, OF KINGMAN, KANSAS.

ICE-MAKING APPARATUS.

SPECIFICATION forming part of Letters Patent No. 752,477, dated February 16, 1904.

Application filed March 27, 1903. Serial No. 149,846. (No model.)

*To all whom it may concern:*

Be it known that I, HIRAM STOUT, a citizen of the United States, and a resident of Kingman, in the county of Kingman and State of Kansas, have invented new and useful Improvements in Ice-Making Apparatus, of which the following is a full, clear, and exact description.

This invention relates to ice-making plants or apparatus; and it consists, substantially, in the construction, organization, and combinations of parts hereinafter particularly described and claimed.

The principal object of the invention is to provide a water-freezing apparatus or plant for the manufacture of ice which is comparatively inexpensive to construct and one also which is reliable and effective in operation, besides being simple, easy of access and control, and also not liable to get out of order.

A further object of the invention is to provide a plant or apparatus of the kind referred to by which the manufacture of ice may be carried on in a rapid manner at a minimum of expense and also without the employment of skilled labor for conducting the same.

The above and additional objects are attained by means substantially as are illustrated in the accompanying drawings, in which—

Figure 1:
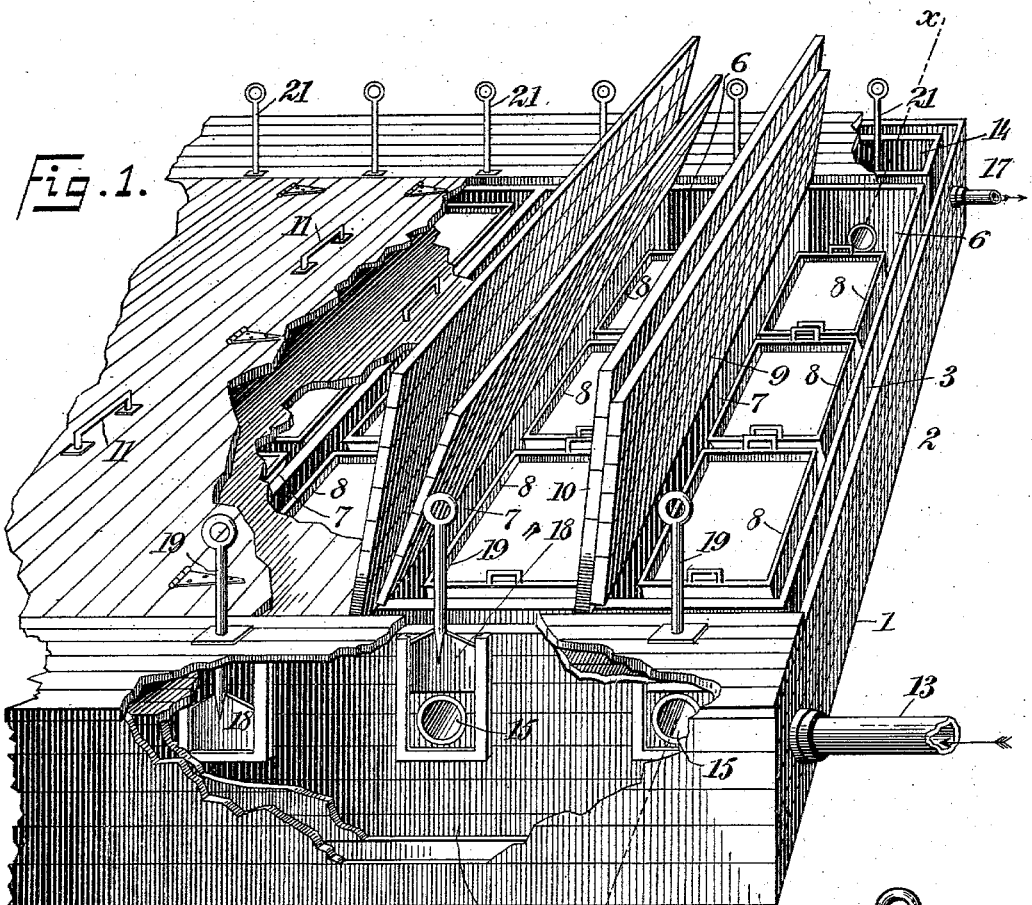
Figure 2:
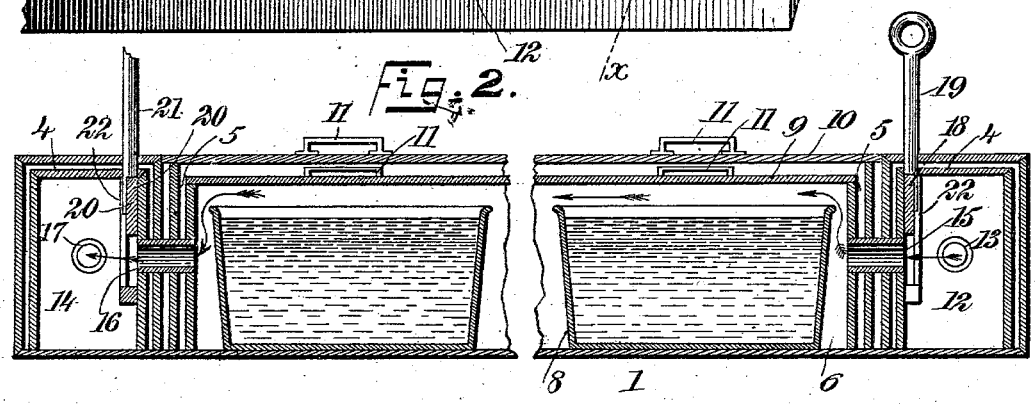
Figure 3:
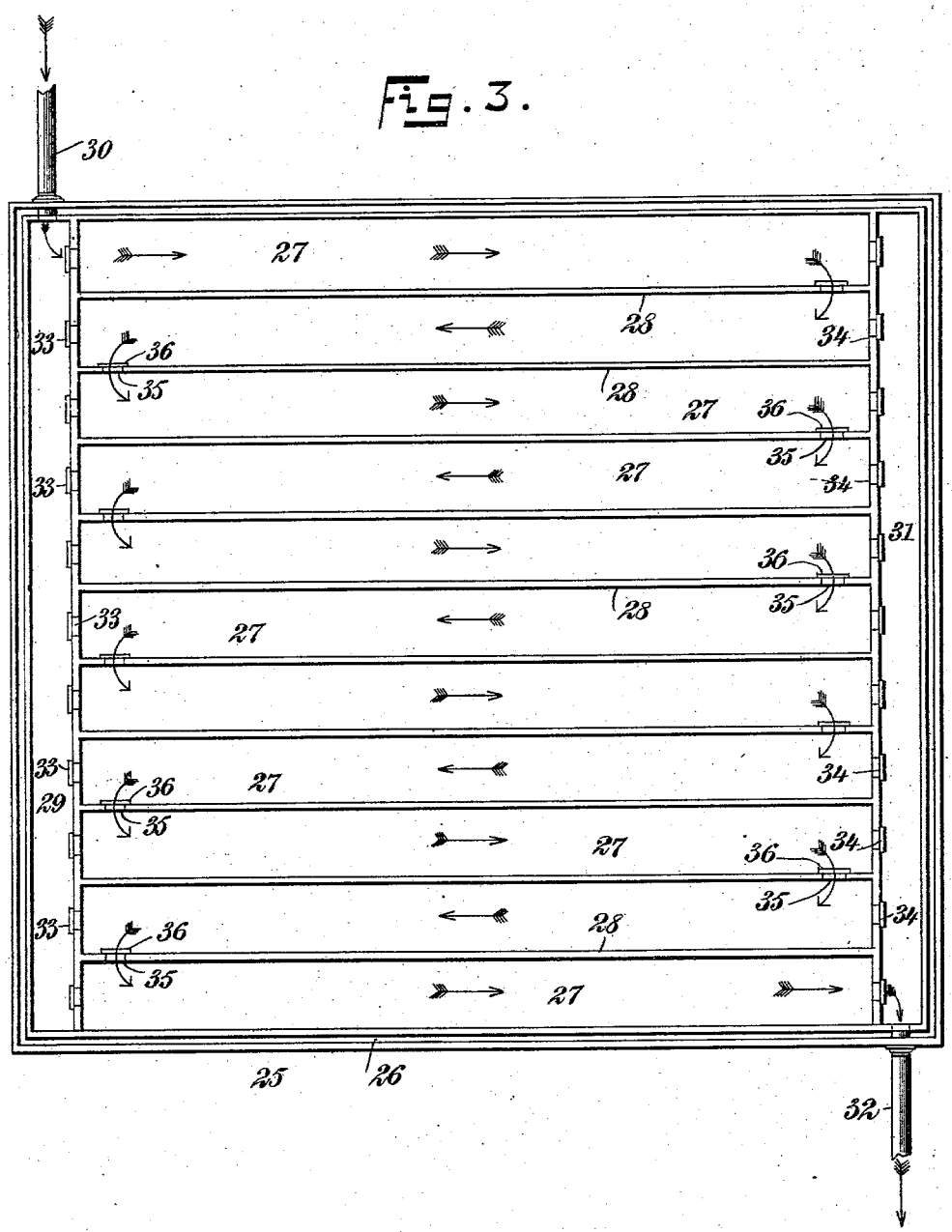

Figure 1 is a view in perspective of an ice-making plant or apparatus the parts of which are constructed and organized in accordance with my improvements, said view being broken out in parts and also showing the covers or lids of some of the water-compartments in raised position. Fig. 2 is a vertical transverse sectional view taken on the line $x$ $x$ of Fig. 1 looking toward the right, said view, however, showing a double inner wall instead of a single inner wall, as in Fig. 1; and Fig. 3 is a top plan view of the plant or apparatus with the covers or lids removed, said view also illustrating a slight modification in the means by which the circulation of compressed air throughout the different compartments of the apparatus is derived.

Before proceeding with a more detailed description it may be stated that my improved ice-making plant or apparatus may be constructed on either a small or a large scale, as may be desired, and the same may also include a single water-compartment only or a series of such compartments, as may be desired, and any suitable material may be employed in the construction thereof. Preferably I construct a plant or apparatus on comparatively an extensive scale and provide the same with a plurality of especially-organized water-compartments, the said plant or apparatus being provided with simple means for effecting the circulation of compressed air within the sides of said compartments. I may use either single or double walls for both the outer and inner structures of the plant or apparatus, and in each of the water-compartments I preferably locate a plurality of pans or tanks for containing water which is to be frozen into ice. I may provide means for the independent circulation of cold air within the sides of each water-compartment or I may employ means for the continuous circulation of such air about the said compartments, either, as may be desired in practice, and it may be stated that the air is admitted to one end of the plant or apparatus and after circulating about the different compartments of the latter passes out at the exit end thereof located at the opposite end of the plant or apparatus, and, if desired, after the cold air has performed its service in effecting the freezing of the water in the pans of the different compartments the said air may be conducted to a cold-storage plant or apparatus and utilized therein in a manner well known.

While I have herein represented a certain preferred embodiment of my improved plant or apparatus, it will be understood that I am not limited to the precise details thereof in practice, since immaterial changes therein may be resorted to coming within the scope of my invention.

Specific reference being had to the drawings by the designating characters marked thereon, 1 represents an ice-making plant or apparatus embodying my improvements, the same being preferably rectangular in shape and of any desired height and other dimensions. I may construct the plant or apparatus of either single outer walls 2 and single inner walls 3, or else construct each of these walls of double form, as indicated at 4 and 5, respectively, (see Figs. 1 and 2,) and I preferably divide the plant or apparatus in one direction into a plurality of separate compartments 6, said compartments being separated by partitions 7, either of single or double form, Figs. 1 and 2, and in each compartment I preferably locate a number of pans or tanks 8, each of a suitable height and for the purpose of containing a quantity of water to be frozen or converted into ice. The height of each of said pans or tanks is somewhat less than the height of the inner walls of the compartments 6, said pans being uncovered or open at the top, as shown. I also provide each of said compartments 6 with a hinged cover or lid 9, adapted to the inner walls of said compartments, (see Fig. 2,) and a similar cover or lid 10, adapted to the outer wall of said compartment, (see also Fig. 2,) and attached or secured to each of the covers or lids referred to is a handle or grip 11 to be taken hold of for the purpose of raising or lowering the lids whenever desired, it being apparent that access may be thus had to either compartment independently of the others.

As shown in Figs. 1 and 2, the plant or apparatus is constructed at one side for the full extent thereof with an inlet-chamber 12 for cold air, said chamber being provided with an inlet-pipe 13, and on the opposite side of the plant or apparatus a similar chamber 14 is formed, each of the water-compartments being in communication with said air-inlet chamber 12 at 15 and also in communication at 16 with the said chamber 14, and in this way it will be seen that cold air on being admitted into the chamber 12 will circulate or pass around the sides of the pans or tanks in each of the said compartments 6, and thence outwardly through an exit-pipe 17, located opposite to the said inlet-pipe 13. Each of the short conduits or pipes 15, leading from the chamber 12 to the several compartments 6, is provided with a sliding gate or valve 18, provided with an upwardly-projecting operating-handle 19, while each of the similar conduits or pipes 16, leading from said compartments 6 to the air-exit chamber 14, is provided with a similar sliding gate or valve 20, having an operating-handle 21, each of the gates or valves 18 and 20 working in suitable guides 22 therefor, as shown. In this way cold air may be admitted into either one or all of the compartments 6 at pleasure, and from the construction and organization of the elements herein described it will appear that the water-tanks may be placed within or removed from either one of the compartments 6 whenever desired by simply raising the covers or lids of said compartments in the manner indicated in Fig. 1. The conversion of the water in the pans or tanks into ice is effected by contact of the cold air passing over the surface of the water and in contact with the sides of said pans or tanks, all as is apparent.

Instead of providing means for the independent or separate circulation of cold air within each compartment 6 it is sometimes desirable to provide means for a continuous circulation of the air from one end of the plant or apparatus to the other, and, as shown in Fig. 3, I provide a similar plant or apparatus 25, preferably having double walls 26 all around the same or exteriorly thereof. The structure is divided into a number of similar water-compartments 27, which are separated by partitions 28, which may be either single or double in form, and at one side of the structure is located an inlet-compartment 29 for cold air, said compartment having an inlet-pipe 30, while at the opposite side of the structure an outlet-compartment 31 for the air is provided, this latter compartment having an exit-pipe 32 for the air, which pipe may be led to any suitable cold-storage apparatus (not shown) for utilization of the air after it has performed its service within the plant or apparatus herein described. In the present form of my improvements each of the compartments 27 is in communication with the air-inlet compartment 29 by means of a suitable gate or valve 33, and in like manner each of said compartments is also in communication with the compartment 31 by means of a similar gate or valve 34, this construction being substantially identical with the corresponding constructions shown in Figs. 1 and 2. However, in order to derive a continuous circulation of cold air throughout all of the compartments from the point of inlet to the point of outlet of the air I provide the partitions 28 between the compartments with openings 35, controlled by valves 36, said openings and valves alternating in position with respect to each other from one end to the other of the several compartments 27, and by closing all of the valves 33 and 34 and opening all of said valves 36 it is apparent that the air on entering the inlet-pipe 30 will circulate throughout the several compartments 27 in the direction indicated by the numerous arrows employed in Fig. 3, which show the course thereof. If, however, it is desired to convert this form of the plant or apparatus into the form shown in Figs. 1 and 2, it is simply necessary to close the said valves 36 and open the said valves 33 and 34.

From the foregoing it is thought that the construction and operation of my improved ice-making plant or apparatus will be thoroughly understood, and it may be stated that in the instance of the employment of double walls for the different parts of the structure I may, if desired, fill the spaces between such walls with any desired non-conducting material, and it is of course apparent that I am not limited to the particular form or character of any of the elements or parts herein specifically referred to, nor am I limited in practice to particular dimensions or character of material employed for the structure.

Having thus described my invention, I claim as new and desire to secure by Letters Patent—

1. An ice-making plant or apparatus, comprising a plurality of partitions forming compartments adapted each to receive one or more pans for containing a liquid to be frozen, an air-inlet chamber having valved communication with each compartment, and an air-outlet chamber having similar communication with said compartments, said partitions being provided with valve-controlled openings, alternating with each other from one end to the other of the compartments, each valve having an upwardly and outwardly projecting operating-handle and each compartment being provided with a lid.

2. An ice-making plant or apparatus, comprising a casing, a plurality of partitions forming compartments adapted each to receive one or more pans or tanks for containing a liquid to be frozen, an air-inlet chamber having valved communication with each compartment, and an air-outlet chamber having similar communication with said compartments; said partitions being provided with valve-controlled openings alternating with each other from one end to the other of the compartments.

In testimony whereof I have signed my name to this specification in the presence of two subscribing witnesses.

HIRAM STOUT.

Witnesses:
ROBERT S. CATES,
OGLE C. CATES.